United States Patent
Lencoski et al.

(10) Patent No.: US 6,277,459 B1
(45) Date of Patent: Aug. 21, 2001

(54) PERFORATED CUSHIONING DUNNAGE PRODUCT, MACHINE AND METHOD FOR MAKING SAME

(75) Inventors: Michael J. Lencoski, Claridon Township; Christopher J. Butcher, Ashtabula, both of OH (US)

(73) Assignee: Ranpak Corp., Concord Twnshp.

( * ) Notice: Subject to any disclaimer, the term of this patent is extended or adjusted under 35 U.S.C. 154(b) by 0 days.

(21) Appl. No.: 09/234,272

(22) Filed: Jan. 19, 1999

(51) Int. Cl.[7] ................................................. B65D 65/28
(52) U.S. Cl. ......................... 428/43; 206/521; 206/522; 428/156; 428/218; 493/967
(58) Field of Search .................... 428/43, 156, 218; 206/521, 522; 493/967

(56) References Cited

U.S. PATENT DOCUMENTS

| | | | |
|---|---|---|---|
| 3,520,220 | 7/1970 | Acker | 83/660 |
| 3,590,695 | 7/1971 | Gerard | 83/660 |
| 3,795,163 | 3/1974 | Armstrong | 83/678 |
| 3,957,186 | 5/1976 | Babcock | 225/3 |
| 4,159,793 | 7/1979 | Belmonte | 225/96.5 |
| 4,358,979 | 11/1982 | Kurzbuch | 83/658 |
| 4,646,954 | 3/1987 | Happ | 225/2 |
| 4,699,031 | 10/1987 | D'Angelo et al. | 83/23 |
| 4,847,126 | 7/1989 | Yamashiro et al. | 428/352 |
| 4,968,291 | 11/1990 | Baldacci et al. | 493/354 |
| 5,123,889 | 6/1992 | Armington et al. | 493/352 |
| 5,131,903 | * 7/1992 | Levine | 493/464 |
| 5,201,117 | 4/1993 | Wright | 29/890.05 |
| 5,203,761 | 4/1993 | Reichental | 493/346 |
| 5,232,430 | 8/1993 | Nitsch | 493/341 |
| 5,322,477 | 6/1994 | Armington et al. | 493/346 |
| 5,340,632 | 8/1994 | Chappuis | 493/407 |
| 5,387,173 | 2/1995 | Simmons, Jr. | 493/407 |
| 5,803,893 | * 9/1998 | Armington | 493/477 |
| 5,997,461 | * 12/1999 | Armington | 493/464 |

FOREIGN PATENT DOCUMENTS

| | | |
|---|---|---|
| WO 96/24540 | 8/1996 | (WO) . |
| WO 96/38272 | 12/1996 | (WO) . |

* cited by examiner

*Primary Examiner*—Nasser Ahmad
(74) *Attorney, Agent, or Firm*—Renner, Otto, Boisselle & Sklar, LLP

(57) ABSTRACT

A novel cushioning conversion machine and method for converting sheet stock material into a novel cushioning product and for producing discrete sections or pads of desired length, without the need for a cutting assembly, thereby enabling the construction of a less expensive, smaller and less complex machine. The machine and method are characterized by a weakening device for perforating a sheet stock material of one or more plies along tear lines so that as a strip of cushioning is formed from the stock material, discrete sections or pads of desired length may be detachable along the tear lines. The stock material includes material which is biodegradable, recyclable and composed of a renewable resource, such as Kraft paper.

6 Claims, 10 Drawing Sheets

PERFORATED CUSHIONING DUNNAGE PRODUCT, MACHINE AND METHOD FOR MAKING SAME

FIELD OF THE INVENTION

The herein described invention relates generally to a cushioning dunnage product, and to a machine and method for converting sheet stock material into a cushioning product.

BACKGROUND OF THE INVENTION

In the process of shipping an item from one location to another, a protective packaging material is typically placed in the shipping case, or box, to fill any voids and/or to cushion the item during the shipping process. Plastic foam peanuts and plastic bubble pack are two types of conventionally used packaging materials. These plastic materials, however, although performing acceptably in many packaging applications, are not without disadvantages. For example, one drawback of plastic bubble film is that it usually includes a polyvinylidene chloride coating which prevents the plastic film from being safely incinerated thereby creating disposal difficulties for some industries. Additionally, both the plastic foam peanuts and the plastic bubble pack have a tendency to generate a charge of static electricity that attracts dust from the surrounding packaging site. Furthermore, these plastic materials sometimes themselves produce a significant amount of packaging "lint." Such dust and lint particles are generally undesirable and may even be destructive to sensitive merchandise such as electronics or medical equipment.

Perhaps the most serious drawback of plastic bubble wrap and/or plastic foam peanuts is their effect on our environment. Quite simply, these packaging materials are not biodegradable and thus they cannot avoid further multiplying our planet's already critical waste disposal problems. The non-biodegradability of these packaging materials has become increasingly important as more industries adopt progressive policies of environmental responsibility.

These and other disadvantages of conventional plastic packaging materials have made paper protective packaging material a very popular alternative. Paper is biodegradable, recyclable and composed of a renewable resource, thereby making it an environmentally responsible choice for conscientious industries. Additionally, the recipients of the products may safely incinerate paper. Furthermore, paper protective packaging material is particularly advantageous for use with particle-sensitive merchandise, as its clean dust-free surface is resistant to static cling.

While paper in a sheet form could possibly be used as a protective packaging material, it is usually preferable to convert sheet stock material into a relatively low density pad-like cushioning product. A cushioning conversion machine may accomplish this conversion, such as those disclosed in U.S. Pat. Nos. 4,968,291 and 5,123,889. The entire disclosures of these patents, which the assignee of the present application owns, are hereby incorporated herein by reference in their entireties.

In a typical cushioning conversion machine, the stock material constituting the starting material for the conversion process will usually be composed of one or more plies of a sheet material rolled onto a hollow, cylindrical tube. Consequently, the stock supply assembly of the cushioning conversion machine is adapted to accommodate this stock material. Alternatively, fan-folded stock material may be used as in the manner described in commonly assigned U.S. Pat. No. 5,387,173.

Cushioning conversion machines in use, today have a forming device and a feeding device that coordinate to convert a continuous web of sheet stock material (either single-ply or multi-ply) into a three dimensional cushioning product, or pad. The forming device is used to fold, or roll, the lateral edges of the sheet stock material inward on itself to form a strip of cushioning having a width substantially less than the width of the stock material. The feeding device advances the stock material through the forming device and it may also function as a crumpling device and/or a connecting (or assembling) device. The cushioning conversion machine may also include a ply separating device for separating the plies of the web before passing through the former.

Cushioning conversion machines heretofore have employed various assemblies for severing the continuous strip of cushioning into discrete sections or pads. Some machines have employed a cutting assembly that automatically produces cushioning pads of a given and consistent length. Others have employed a cutting assembly that requires an operator to manually control the length of the pad being cut. The cutting assembly in either the manual or non-manual system adds to the overall cost, size and complexity of a conversion machine. Also, the individual pads are formed only when the machine is operating. It would be desirable to provide a method of separating the strip of cushioning into discrete sections without the need for a cutting assembly and/or at a time other than when the strip of cushioning is formed.

SUMMARY OF THE INVENTION

The present invention provides a novel cushioning conversion machine and method for converting sheet stock material into a novel cushioning product and for providing sections or pads of desired length, without the need for a cutting assembly, thereby enabling the construction of a less expensive, smaller and less complex machine. According to another aspect of the invention, there is provided a cushioning conversion machine and method for producing a continuous strip of dunnage having spaced along the length thereof weakened sections or tear lines at which individual sections or pads can be separated easily and without the need for a severing device. As will be appreciated, a continuous strip of cushioning may be produced and stored for later use when individual sections are removed from the strip as needed.

The machine and method are characterized by a weakening device for perforating or otherwise weakening sheet stock material of one or more plies along tear lines so that as a strip of cushioning is formed from the stock material, discrete sections or pads of desired length may be detached along the tear lines. In accordance with various embodiments of the invention, the stock material may be perforated or weakened by a mechanical device, a chemical device, a laser, an electromagnetic device, a radiation device, etc. A preferred device for perforating the sheet stock material includes at least one multi-edged cutting member which may be, for example, a serrated blade.

In accordance with a preferred embodiment, a pair of rotating members, such as coining gears, cooperate to draw the sheet stock material through the conversion machine. A multi-edged blade rotates with each rotating member and cooperates with the other blade to perforate the stock material as the serrated blades simultaneously rotate past the path of the stock material. The perforations created thereby may be in any of a wide variety of shapes and directions across and/or along the stock material.

In another embodiment, the multi-edged blades are separate from the rotating members and independently rotated. Preferably the blades are located downstream of the rotating members to perforate the formed and connected strip of cushioning along tear lines.

Another aspect of the invention is characterized by a cushioning product produced by the process of supplying a multi-ply sheet stock material to a cushioning conversion machine (which permanently deforms the stock material to form a relatively low density, three-dimensional strip of cushioning) and then weakening the strip of cushioning by perforating the strip along transversely extending tear lines so that the strip is severable along the tear lines into discrete sections or pads of the desired length. In a preferred embodiment, the supply of sheet stock material should include stock material which is biodegradable, recyclable and composed of a renewable resource, such as Kraft paper.

The invention further provides a method wherein a cushioning conversion machine is supplied with sheet stock material that is weakened, for example by perforating, along tear lines. The machine converts the sheet stock material into a relatively low density three dimensional strip of cushioning. The strip of cushioning will have weakened sections along which individual sections or pads can be separated from the strip.

The foregoing and other features of the invention are hereinafter fully described and particularly pointed out in the claims, the following description and annexed drawings setting forth in detail certain illustrative embodiments of the invention, these being indicative, however, of but a few of the various ways in which the principles of the invention may be employed.

DETAILED DESCRIPTION OF THE INVENTION

Figure 1:
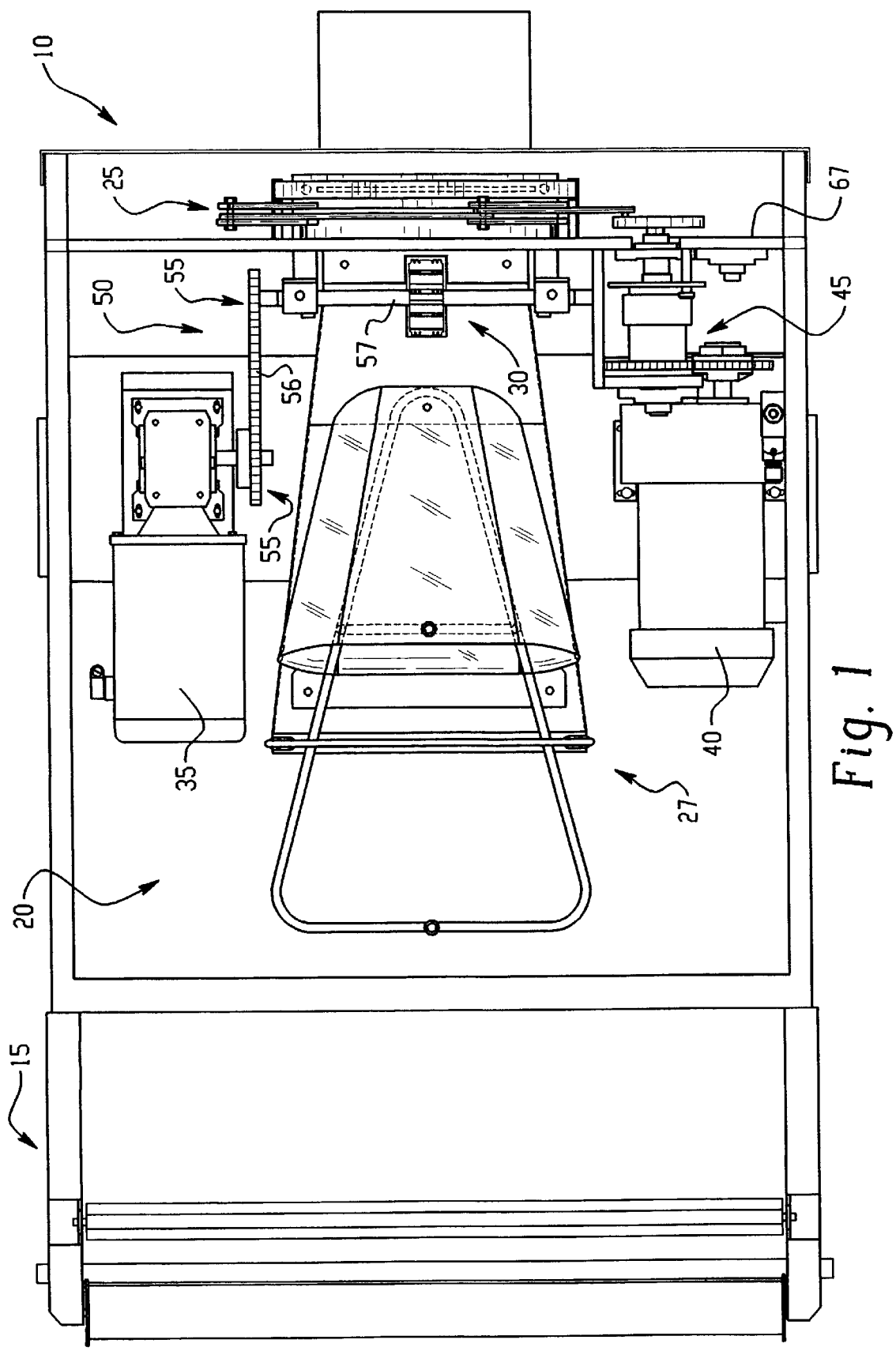
FIG. 1 is a pictorial top view of a cushioning conversion machine according to the invention with the top wall of the machine's housing nearest the viewer removed to permit viewing of internal machine components.
Figure 2:
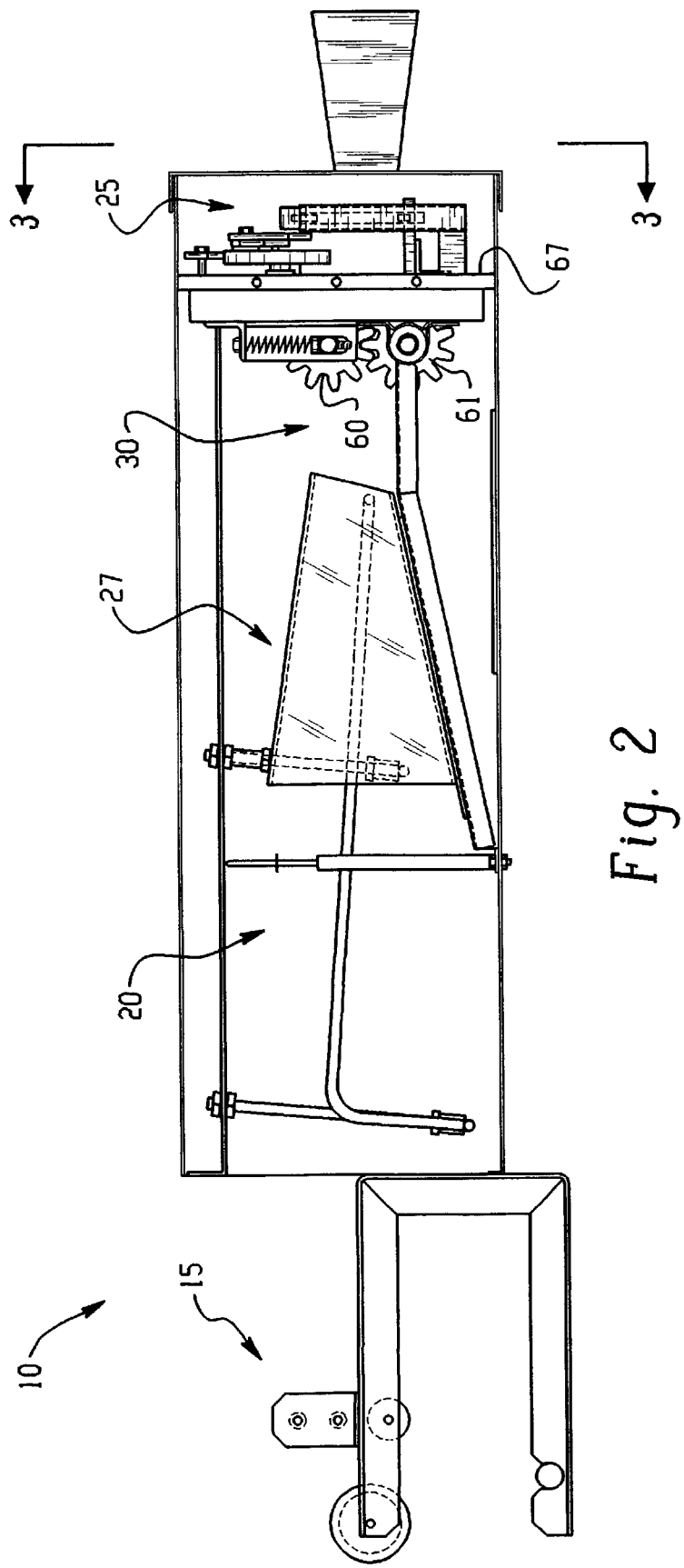
FIG. 2 is a pictorial side view of the cushioning conversion machine of FIG. 1, with the side wall of the machine's housing nearest the viewer removed to permit viewing of internal machine components.

Referring now in detail to the drawings and initially to FIGS. 1 and 2, there is illustrated an exemplary embodiment of a cushioning conversion machine 10 according to the invention. The cushioning conversion machine 10 includes a stock material supply assembly 15, a conversion mechanism 20 for converting sheet stock material into a three-dimensional strip of cushioning, and a weakening device 25 for perforating the strip to form tear lines whereby the strip of cushioning may be detachable along the tear lines to form discrete sections or pads. The weakening device 25 is powered by a motor 40, preferably an electric motor, selectively engageable with the weakening device 25 by a clutch 45. The conversion mechanism 20 preferably includes a forming assembly 27 and a feed assembly 30 powered by a motor 35, preferably an electric motor.

The motor 35 powers the feed assembly 30 through a drive arrangement 50 that may include a number of elements such as sprockets 55, a chain 56 and a shaft 57 for transferring rotational power to the feed assembly 30. The feed assembly 30 includes two opposed rotating members 60 and 61 which, according to a preferred embodiment, are coining gears. One rotating member, such as the upper rotating member 60, is driven by the drive arrangement 50 while the other rotating member, in this case the lower rotating member 61, is driven due to it being in mesh with the upper rotating member.

During the conversion process, sheet stock material is pulled from the stock supply assembly 15 and transferred to the conversion mechanism 20. The sheet stock material may consist of a plurality of superimposed plies of biodegradable and recyclable Kraft paper rolled onto a hollow cylindrical tube. Three plies of the stock material are preferred, and the stock material may be provided alternatively as a fan-folded stack of material. The conversion mechanism 20 converts the sheet stock material into a continuous strip of cushioning.

More specifically, as the feed assembly 30 pulls the stock material through the forming assembly 27, the forming assembly 27 causes the lateral edges of the stock material to roll or fold inwardly to form a continuous strip having two lateral pillow-like portions and a central band therebetween. The feed assembly 30 performs a "pulling" function by drawing the continuous strip through the nip of the two cooperating and opposed rotating members 60 and 61 of the feed assembly 30 thereby drawing stock material through the forming assembly 27.

The rotating members 60 and 61 additionally perform a "coining" or a "connecting" function as the opposed rotating members 60 and 61 coin the central band of the continuous strip as it passes therethrough to form a coined strip. As the connected (coined) strip travels downstream from the feed assembly 30, the strip passes through the weakening device 25. In alternative embodiments, the weakening device 25 may be placed between the supply assembly 15 and the feed assembly 30 or between the forming assembly 27 and the feed assembly 30, or even upstream of the forming assembly.

Figure 3:
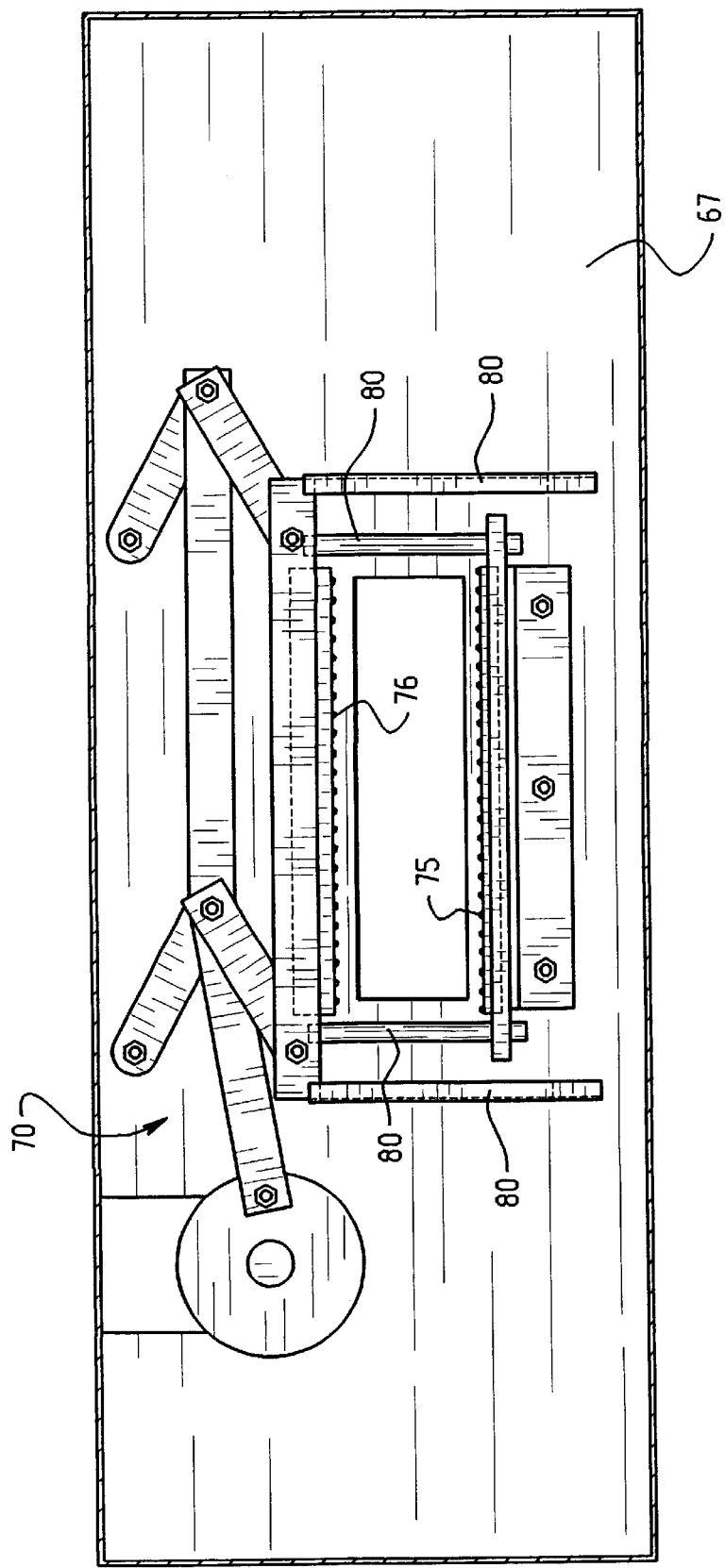
FIG. 3 is an end view of the machine taken along the line 3—3 of FIG. 2, with an end cover removed to show a weakening device according to the invention.
Figure 5:
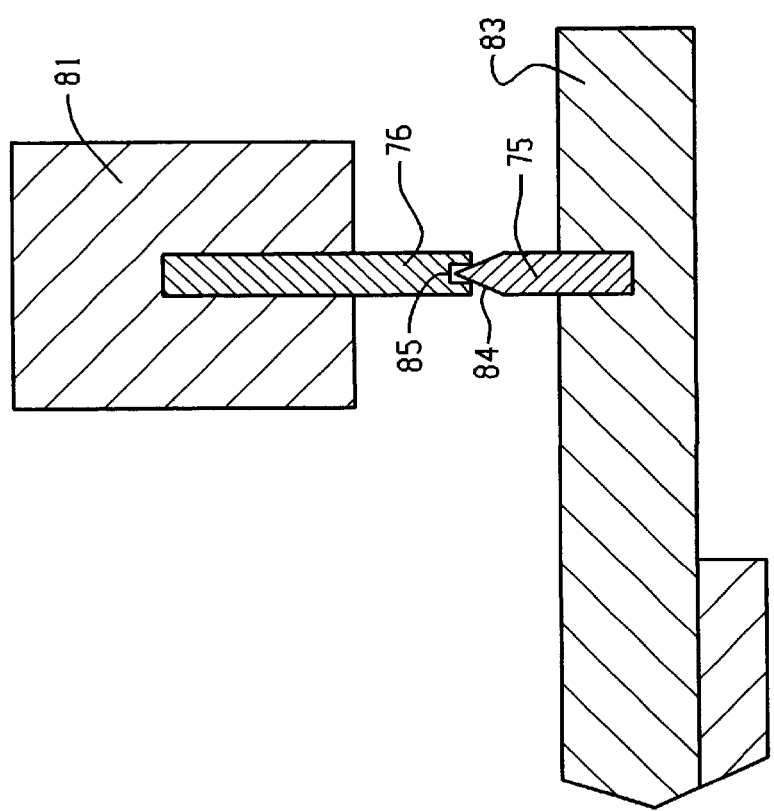
FIG. 5 is a cross-sectional view of the weakening device taken along the line 5—5 of FIG. 4.
Figure 4:
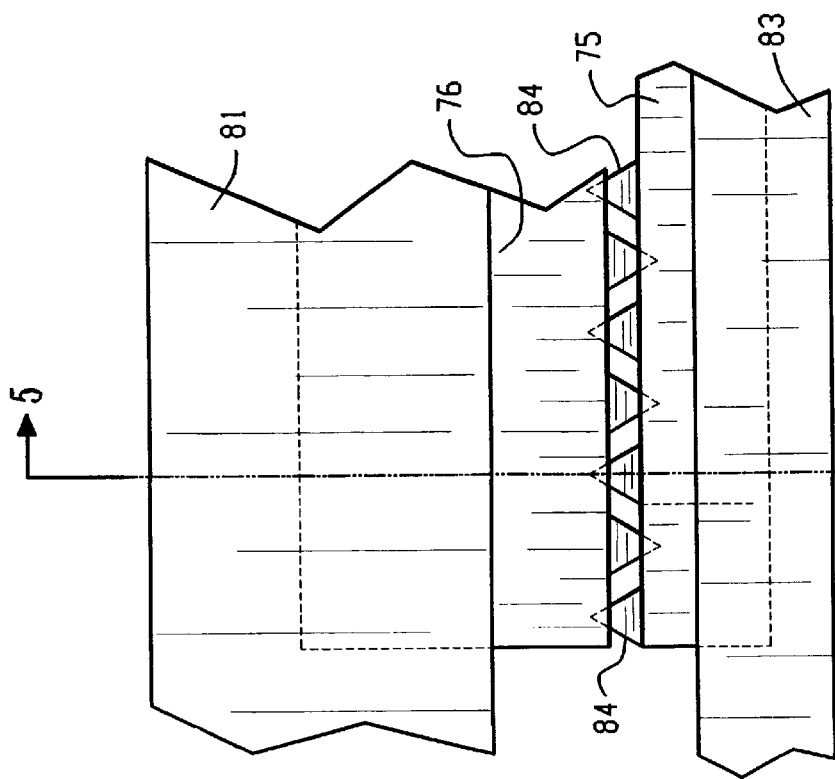
FIG. 4 is an enlarged partial view of the weakening device of FIG. 3, showing in particular the engagement of the severing members.

One embodiment of the weakening device 25 is shown in FIGS. 3–5. The weakening device 25 is attached to a downstream end wall 67 of the machine's housing. The weakening device 25 is connected to the motor 40 through a linkage assembly 70 that is connected to the motor 40 by the clutch 45. The linkage assembly 70 transfers the rotational motion of the motor 40 to linear motion for driving the weakening device 25 and perforating the strip of cushioning. In the illustrated embodiment, feeding of the strip is first stopped and then the weakening device is operated to perforate the strip.

The weakening device 25 includes a stationary blade member 75 and a dynamic blade member 76. The linkage assembly 70 imparts linear motion to the dynamic blade member 76 that is directed by guide members 80 to descend upon the stationary blade member 75 so as to cooperate with the stationary blade member 75 to perforate the strip of cushioning located therebetween.

The dynamic blade or severing member 76 is held by a linkage member 81 and the stationary severing member 75 is held by a support member 83. The two blade members cooperate to perforate the strip of cushioning, each having a plurality of laterally spaced perforating elements or cutting edges 84 and respective recesses or slots 85 for receiving the tips of corresponding cutting elements on the other blade member. These perforating elements 85 are spaced apart along each blade member 75 and 76 and staggered with the blade elements of the other blade member such that when the blade members 75 and 76 come together the cutting elements perforate the strip of cushioning to weaken the strip along a tear line. Alternatively, each perforating element 85 could line up across from another perforating element 85 so as to cut the strip of cushioning between them. The shape of the perforations created by the perforating elements 85 could include slits, slots, stars, circles, triangles, rectangles or any other shape or combination of shapes. A further modification is illustrated in FIG. 5B where the blade member 76 is replaced by a backing member 76' composed of a resilient material, for example a urethane resilient material such as Neoprene.

Figure 5A:
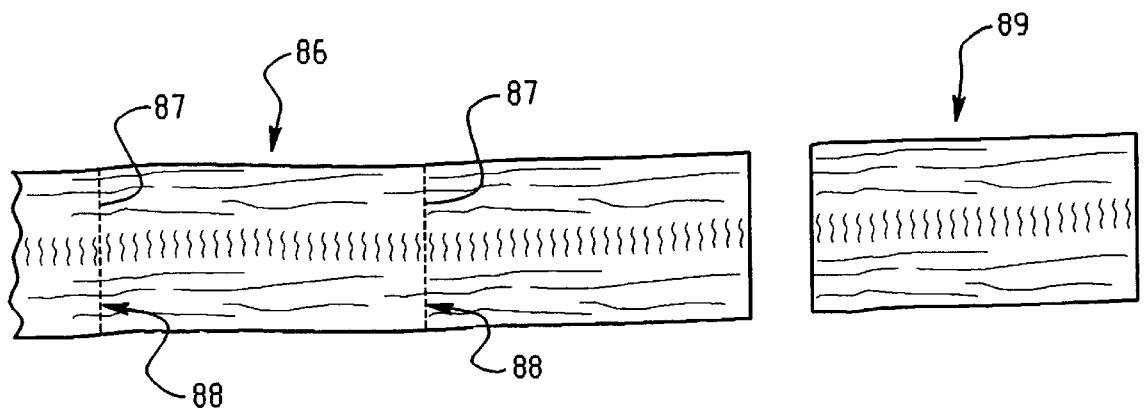
FIG. 5A is a plan view of an exemplary strip of cushioning that has been perforated (or otherwise weakened) along tear lines in accordance with the present invention, with one section shown separated from the strip.
Figure 5B:
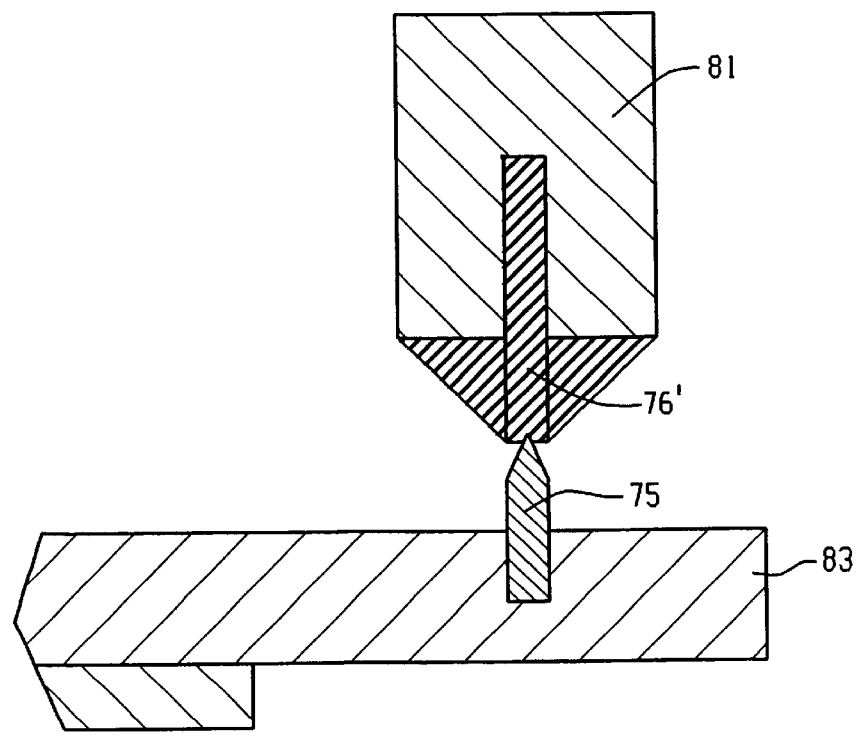
FIG. 5B is a cross-sectional view similar to FIG. 5, showing a modified form of weakening device.

In FIG. 5A, an exemplary strip 86 of cushioning has been perforated to form longitudinally spaced apart rows of slits 87 defining respective weakened tear lines 88. FIG. 5A also shows one section 89 separated from the strip 86.

Figure 6:
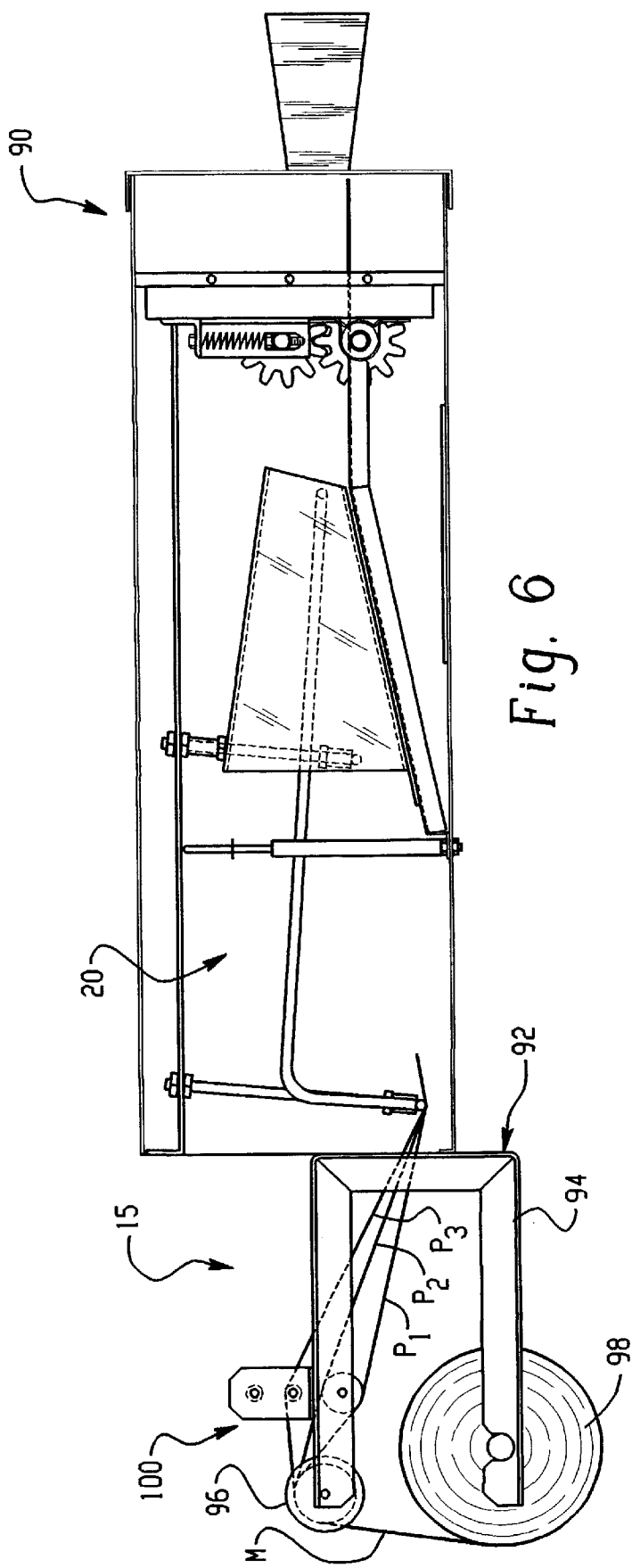
FIG. 6 is a pictorial side view of yet another embodiment of cushioning conversion machine according to the invention, the side wall of the machine's housing nearest the viewer removed to illustrate the internal components of the machine.

FIG. 6 illustrates another embodiment of a cushioning conversion machine of the present invention. A cushioning conversion machine 90 includes a stock material supply assembly 15 and a conversion mechanism 20 as above described. The stock material supply assembly 15 includes a pair of laterally spaced apart U-shaped brackets 92 secured to the rear or upstream end of the machine's housing. The upstream projecting legs 94 of the brackets 92 have journalled therebetween a constant entry roller 96 that provides a non-varying point of entry for the sheet stock material M from a stock roll 98. The legs 94 also support therebetween a separating mechanism 100 that receives the sheet stock material M from the constant entry roller 96 and separates multiple plies $P_1$ through $P_3$ from one another prior to passage into the conversion mechanism 20. For further details concerning the constant entry roller 96 and separating mechanism 100, reference may be had to U.S. Pat. No. 4,750,896.

Figure 6A:
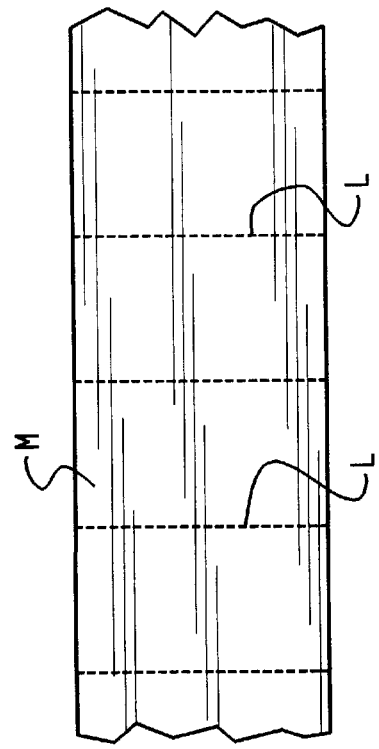
FIG. 6A is a plan view of a perforated stock material for use with the cushioning conversion machine.

Noticeably absent from the cushioning conversion machine 10 of FIG. 6 is a cutting assembly or even a perforating device. This is enabled by use of a pre-perforated sheet stock material M shown in FIG. 6A which may have one or more plies, preferably two or three plies, and perforated tear lines L spaced apart along the length of the material M. The material is supplied in a well-known manner for conversion by the conversion mechanism 20 into a strip of cushioning having perforated tear lines spaced apart the length thereof. Because of the change in shape of the stock material M during the conversion process, the resulting tear line (or tear plane) is generally irregular in shape. As a result, the discrete cushioning products may have more contoured edges than when the perforations are formed after the conversion to a three-dimensional strip of cushioning (FIGS. 1–3).

Figure 7:
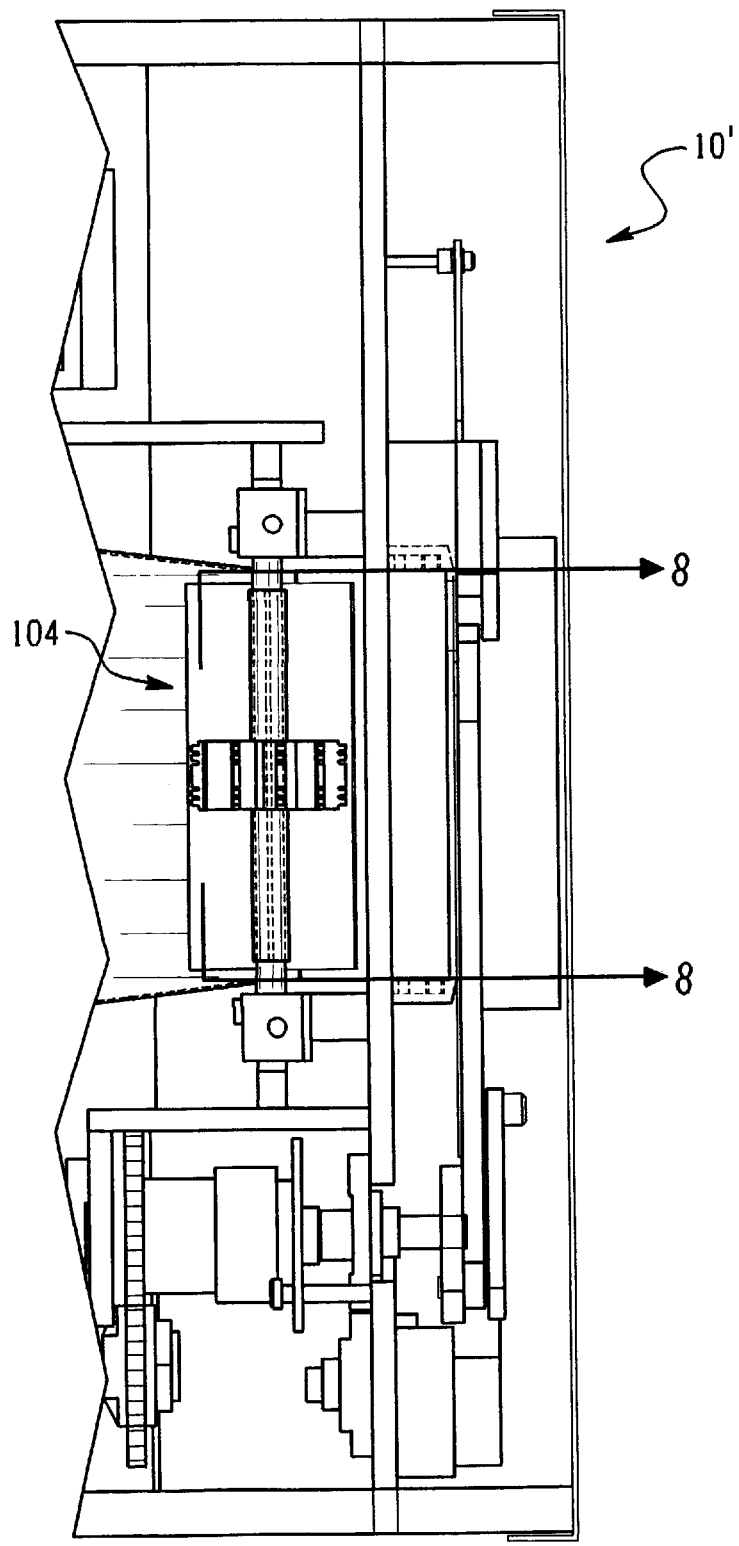
FIG. 7 is a partial pictorial top view of a further embodiment of cushioning conversion machine similar to the machine shown in FIG. 6, the top wall of the machine's housing nearest the viewer removed to illustrate the internal components of the machine, showing in particular the feed assembly.
Figure 8:
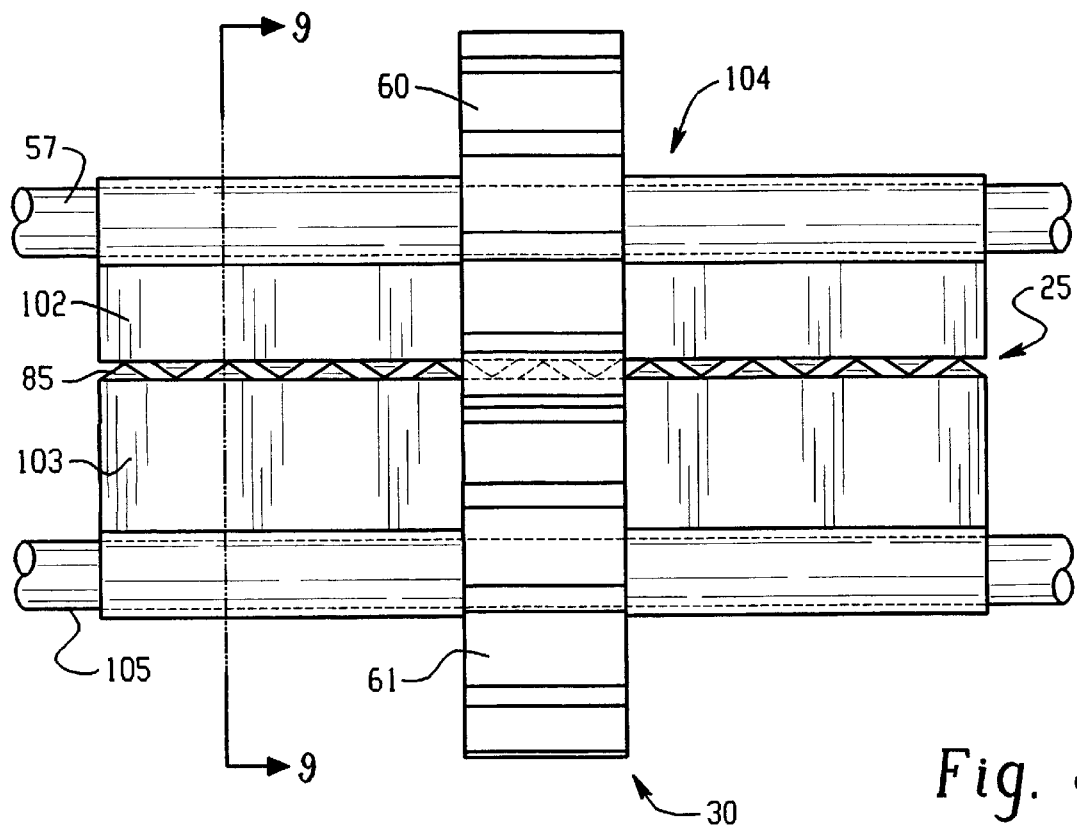
FIG. 8 is a sectional view of the feed assembly taken along the line 8—8 of FIG. 7, showing in particular the puncturing elements aligned so as to cooperatively perforate the stock material.
Figure 9:
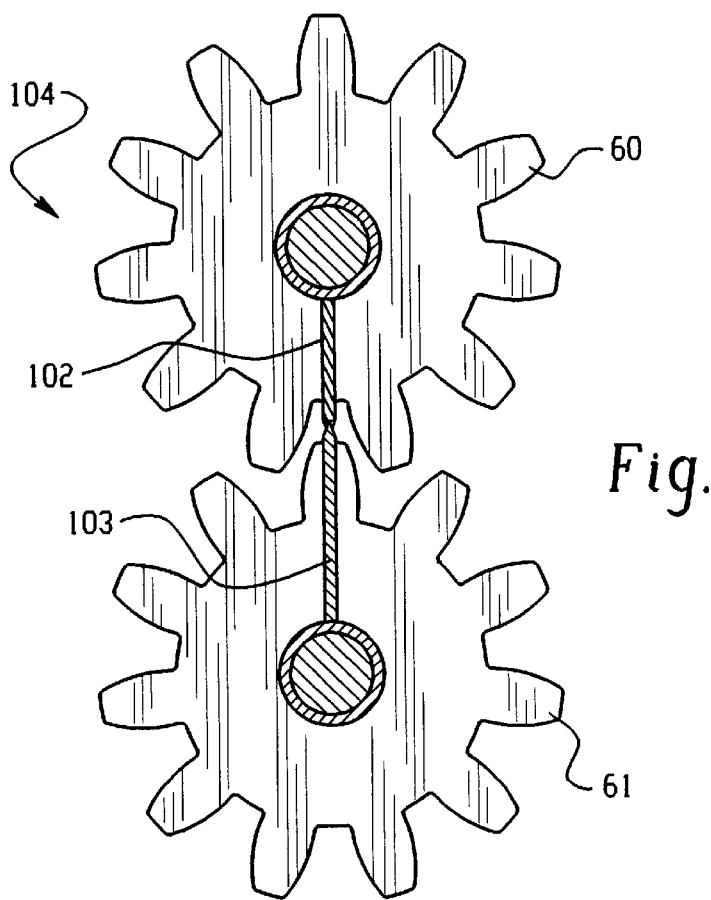
FIG. 9 is a cross-sectional side view of the feed assembly taken along the line 9—9 of FIG. 8.

FIGS. 7 through 9 illustrate a further embodiment of cushioning conversion machine according to the present invention. The cushioning conversion machine 10' is the same as that shown in FIGS. 1–3, except that the feed assembly and the weakening device are integrated into a single assembly 104. FIGS. 8 and 9 better illustrate this arrangement. It is noted that although a cutting assembly is not shown in FIGS. 7 and 9 (or FIG. 6), one optionally could be provided for optional cutting of the strip.

As seen in FIGS. 8 and 9, the assembly 104 includes the previously described feed assembly 30 and a pair of blade members 102 and 103 which are affixed to the shaft 57 and 105, respectively, for rotation therewith. The blade members 102 and 103 meet at approximately the pitch circle of the upper rotating member 60. As the shafts rotate, the blade members 102 and 103 rotate through the path of the stock material, the blade members 102 and 103 come together and the perforating elements on the blade members aligned thereon cooperatively perforate the stock material. The shafts 57 and 105 are rotatably synchronously driven by suitable means. For example, one shaft may be driven by the other by means of synchronization gears, timing belts, etc., or both may be directly driven if desired. The blade members 102 and 103 may be the same as described above in connection with FIGS. 4 and 5, or FIG. 5B. Other blade configurations may also be used, such as that illustrated in FIGS. 8 and 9. In FIGS. 8 and 9, the blades 102 and 103 have serrated cutting edges with the cutting elements thereof staggered with respect to one another as shown.

Figure 11:
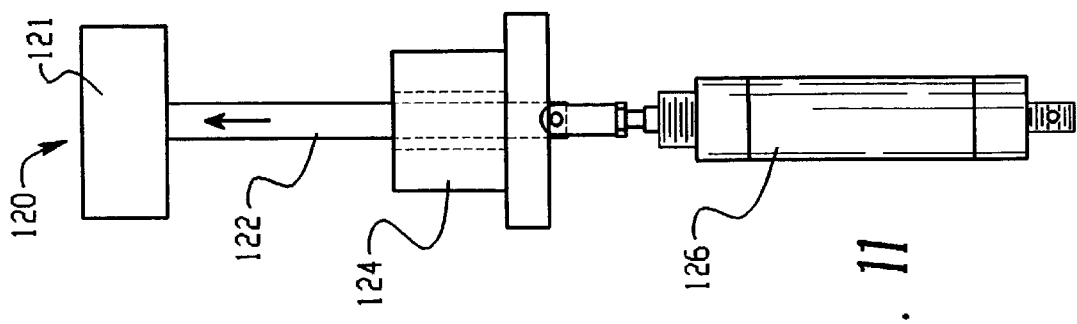
FIG. 11 is a side view of the holding assembly of FIG. 10.
Figure 10:
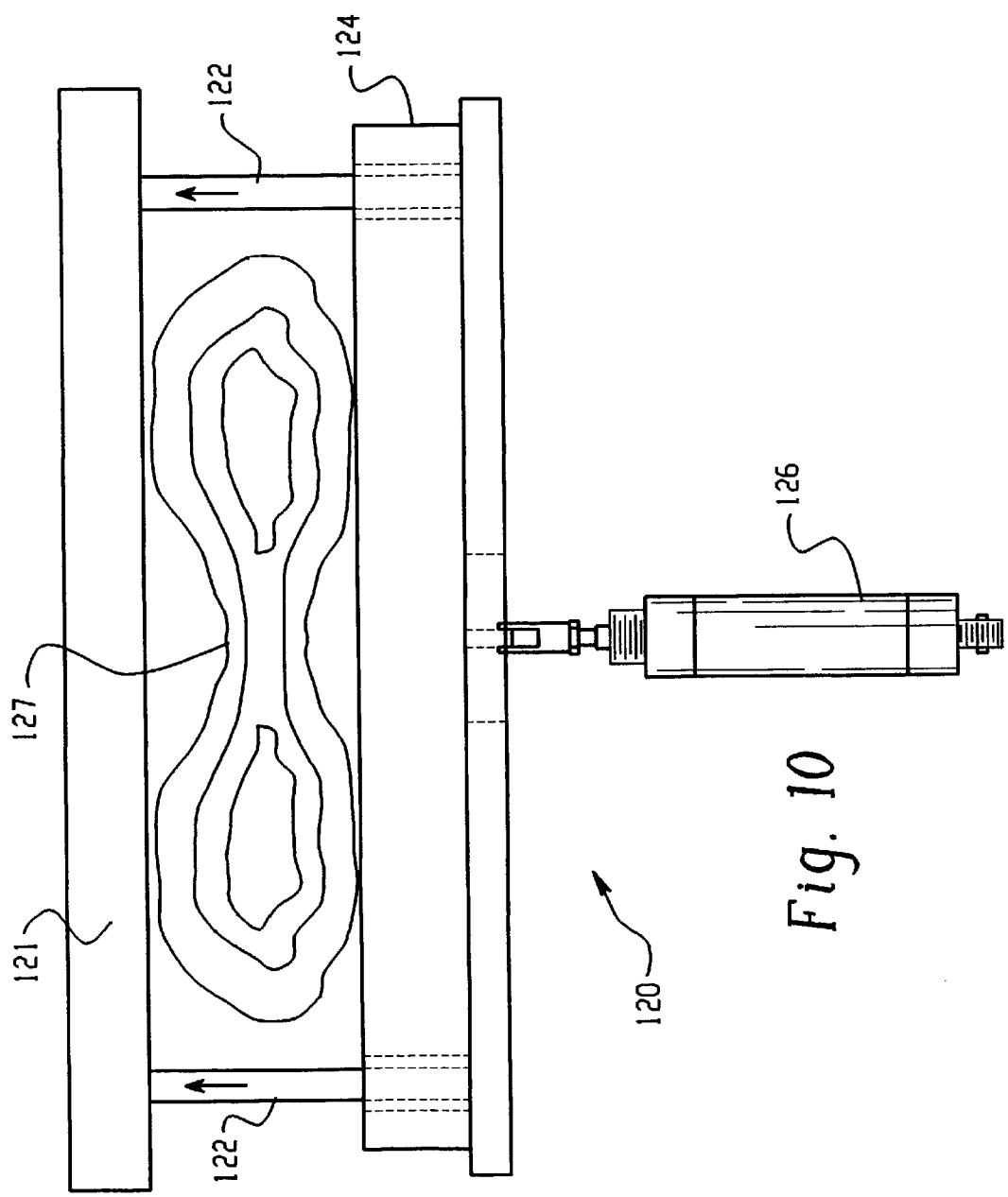
FIG. 10 is a front end view of a holding assembly according to the present invention.

The cushioning conversion machine 10 (including any of the above described alternative arrangements) may additionally include a holding device or assembly for facilitating tearing of a section of the perforated strip of cushioning from the remainder of the strip in the machine. In FIGS. 10 and 11, an exemplary holding assembly 120 includes a stationary bar 121 that is suitably mounted to the frame of the machine downstream of the conversion assembly. The stationary bar or jaw 121 has a pair of guide rods 122 projecting therefrom for guiding movement of a moveable jaw 124. The moveable jaw may be equipped with bushings for smooth guided movement on the guide rods toward and away from the stationary bar. Such movement is effected by a motive device 126 which in the illustrated embodiment is a pneumatic piston-cylinder assembly or an electric solenoid.

When the feed motor of the machine is operated to form a strip of cushioning, the moveable jaw 124 is retracted away from the stationary jaw 121 to an ambush position shown in FIGS. 10 and 11, such position being clear of the path of the perforated strip 127 of cushioning exiting from the machine. After a desired length of the perforated strip has been produced, the feed motor is stopped or disengaged. The motive device 126 is energized to move the moveable jaw 124 toward the stationary jaw to pinch and thus hold the perforated strip therebetween. A section of the perforated strip protruding beyond the holding device can then be torn along a tear line formed by the perforations at a location downstream of the holding device to provide a section or pad that can be used for packaging purposes. After the section has been torn from the strip, the motive device is operated to move the moveable jaw away from the stationary jaw to allow an additional length of perforated strip of cushioning to be produced. If desired, a sensor may be strategically positioned downstream of the holding assembly to detect removal of the torn section of the strip and provide in response thereto a control signal to the machine for controlling operation of the machine. For example, the holding device can be opened automatically in response to a control signal from the sensor.

The cushioning conversion machine 10 (including any of the above described alternative arrangements) may additionally include a tearing device or assembly to tear the perforated strip of cushioning from the stock material remaining in the conversion assembly. Either simultaneously with the perforation of the strip of cushioning or thereafter, a tearing assembly may grab the perforated strip of cushioning downstream of the conversion mechanism and downstream of a tear line and then pull the strip of cushioning at a rate faster than the rate of feed so as to separate the strip of cushioning along a tear line, thereby creating a discrete cushioning product. The tearing assembly may then deposit the cushioning product beyond the machine so as to be used as cushioning dunnage.

Figure 12:
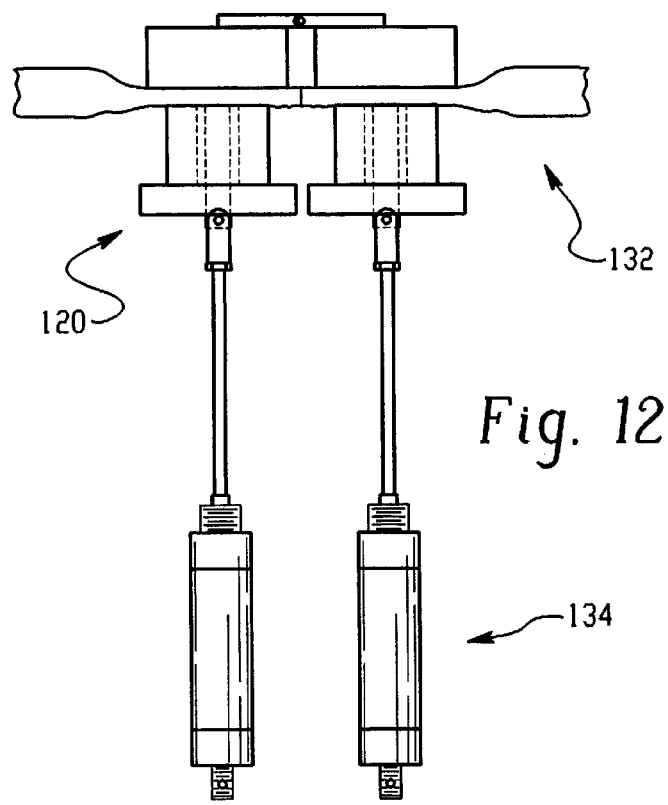
FIG. 12 is a front end view of a tearing assembly according to the present invention.
Figure 13:
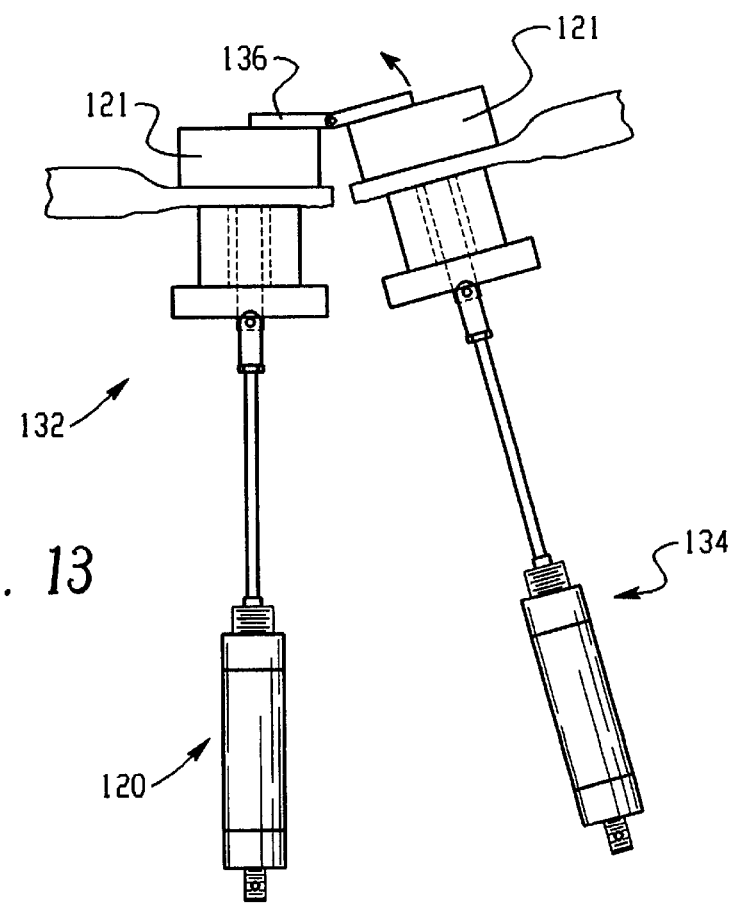
FIG. 13 is a view of the tearing assembly of FIG. 12, showing the assembly in a tearing position.

FIGS. 12 and 13 show another exemplary tearing assembly 132 that includes the above described holding assembly 120 (here referred to as a stationary holding assembly) and a similar but movable holding assembly 134. The movable holding assembly 134 is suitably mounted in the machine for movement toward and away from the stationary holding assembly 120. For example, the stationary jaw 121 of the moveable holding assembly 134 can be mounted to the stationary jaw 121 of the stationary holding assembly for pivotal movement effected by suitable motive means, for example a pneumatic piston-cylinder assembly or solenoid (not shown). Thus, the moveable holding assembly can be pivoted relative to the stationary holding assembly. As will be appreciated, the moveable holding assembly can be mounted for movement other than pivoting movement and for pivoting movement about a different axis, such as an axis extending parallel to the length of perforated strip. The holding assembly may be suitably mounted to a frame and preferably may have its own frame structure, be enclosed in its own housing and the frame or housing attached to the machine.

In use, initially the stationary and moveable holding assemblies 120 and 132 are positioned adjacent one another as shown in FIG. 12. When the feed motor of the machine is operated to form a strip of cushioning, the moveable jaw 124 of each holding assembly is retracted away from the respective stationary jaw 121 to permit passage of the perforated strip 127 of cushioning between the stationary and moveable jaws of each holding assembly. After a desired length of the perforated strip has been produced, the feed motor is stopped or disengaged. The motive device 126 of each holding assembly is energized to move the moveable jaws 124 toward the stationary jaws to pinch and thus hold the perforated strip therebetween at locations disposed on opposite sides of a tear line defined by perforations formed in the strip of cushioning. Alternatively, either holding assembly may include perforating elements to form the perforations in the strip. With the strip thus held, the moveable holding assembly 132 is pivoted (or otherwise moved) relative to the stationary holding assembly 120 to effect tearing of perforated strip along the tear line. Then, the jaws to the assemblies are opened to permit the torn section of cushioning to be removed. Also, the moveable assembly is returned to its original position for production an additional length of perforated strip of cushioning.

A sensor or other device may be used to detect the position of the tear line. In the embodiment described with respect to FIGS. 10 and 11, preferably the tear line is located at a point that is close to but downstream of the holding assembly 120. In the embodiment described with respect to FIGS. 12 and 13, the tear line preferably is located at a point between the jaws of the holding assemblies 120 and 134, respectively. A sensing device such as an encoder may be relied upon to monitor the rotation of the gears and accurately position the perforated tear line between the tearing assemblies. An exemplary device is described in commonly owned U.S. patent application Ser. No. 08/155,116, hereby incorporated herein in its entirety.

Although the invention has been shown and described with respect to a certain preferred embodiment or embodiments, equivalent alterations and modifications will occur to others skilled in the art upon reading and understanding this specification and the annexed drawings. The present invention includes all such equivalent alterations and modifications. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e. that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may is be desired and advantageous for any given or particular application.

What is claimed is:

1. A dunnage product comprising a one or more plies of paper crumpled on itself to form a strip of dunnage, the strip having weakened tear lines spaced apart along the length thereof at which the strip maybe separated to form discrete sections, wherein the strip includes lateral pillow portions and a central band therebetween, the layers of paper in the central band being interconnected.

2. A dunnage product as set forth in previous claim 1, wherein the layers of paper in the central band are mechanically interconnected.

3. A dunnage product as set forth in previous claim 2, wherein the layers of paper in the central band are coined.

4. A dunnage product as set forth in claim 1, wherein the tear lines lie in transverse planes across a width of the strip of dunnage.

5. A dunnage product as set forth in the previous claim 4, wherein the tear lines are formed of rows of spaced apart slits.

6. A dunnage product as set forth in claim 1, wherein the tear lines form an end of a discrete section that has a nonplaner irregular shape.

* * * * *